(12) United States Patent
Little et al.

(10) Patent No.: US 8,966,054 B2
(45) Date of Patent: Feb. 24, 2015

(54) METHOD, SYSTEM AND MOBILE DEVICE FOR IMPLEMENTING A SERVERLESS PRESENCE SYSTEM

(75) Inventors: Herbert A. Little, Waterloo (CA); Michael S. Brown, Waterloo (CA)

(73) Assignee: BlackBerry Limited, Waterloo (CA)

( * ) Notice: Subject to any disclaimer, the term of this patent is extended or adjusted under 35 U.S.C. 154(b) by 546 days.

(21) Appl. No.: 12/420,150

(22) Filed: Apr. 8, 2009

(65) Prior Publication Data

US 2010/0262660 A1     Oct. 14, 2010

(51) Int. Cl.
*G06F 15/173* (2006.01)
*H04L 29/08* (2006.01)
*H04L 29/06* (2006.01)

(52) U.S. Cl.
CPC ............... *H04L 67/24* (2013.01); *H04L 67/04* (2013.01); *H04L 69/28* (2013.01)
USPC ....................................... 709/224

(58) Field of Classification Search
USPC .......... 709/204, 206, 227, 238, 245; 345/179; 382/177, 179, 181, 187
See application file for complete search history.

(56) References Cited

U.S. PATENT DOCUMENTS

| | | | | |
|---|---|---|---|---|
| 6,463,471 | B1 * | 10/2002 | Dreke et al. | 709/224 |
| 6,754,621 | B1 * | 6/2004 | Cunningham et al. | 704/219 |
| 2004/0153534 | A1 * | 8/2004 | Gibart et al. | 709/223 |
| 2004/0249953 | A1 * | 12/2004 | Fernandez et al. | 709/227 |
| 2005/0071426 | A1 * | 3/2005 | Shah | 709/204 |
| 2006/0240855 | A1 | 10/2006 | Kalhan | |
| 2006/0242235 | A1 | 10/2006 | Classen | |
| 2008/0019291 | A1 * | 1/2008 | Sienel et al. | 370/258 |
| 2009/0089139 | A1 | 4/2009 | Rojas-Cessa et al. | |

FOREIGN PATENT DOCUMENTS

| | | |
|---|---|---|
| EP | 1881676 | 1/2008 |
| WO | WO 03/065701 | 8/2003 |
| WO | WO 2006/091178 | 8/2006 |

OTHER PUBLICATIONS

Han, Seungjae, and Shin, Kang. "Experimental Evaluation of Failure-Detection Schemes in Real-time Communication Networks." IEEE. 1997.*
"round robin," posted Apr. 11, 2003, downloaded from <http://web.archive.org/web/20070612074203/http://whatis.techtarget.com/definition/0,,sid9_gci214491,00.html>.*

(Continued)

*Primary Examiner* — Scott Christensen
(74) *Attorney, Agent, or Firm* — Ridout & Maybee LLP

(57) ABSTRACT

A method, system and mobile communication device for implementing a serverless presence system are provided. In accordance with one embodiment, there is provided a method of sharing presence information between a group of mobile communication devices configured to communicate over a wireless network, the mobile communication devices defining the group members of the group, the method comprising: sending a data packet from a sending group member to at least one of the other group members; determining a presence status in accordance with whether a delivery acknowledgement is received by the sending group member from each of the other group members to which the data packet was sent within a predetermined duration from the sending of the data packet; storing the determined presence status in memory; and sending a presence update comprising the determined presence status of at least some of the group members to all of the group members.

24 Claims, 5 Drawing Sheets

(56) References Cited

OTHER PUBLICATIONS

K. Matsuura, T. Toyono & K. Takahashi, FieldCast: Peer-to-Peer Presence Information Exchange in Ubiquitous Computing Environment, IEICE Trans., Inf. & Syst.. vol. E87-D, No. 12 Dec. 2004.

P. Muilu & T. Syrjanen, Mobile Peer-to-Peer Media and Presence Community, Consumer Communications and Networking Conference, 2008. CCNC 2008. 5th IEEE, Jan. 10-12, 2008.

D. Greene & D. O'Mahoney, Instant Messaging & Presence Management in Mobile Ad-Hoc Networks, Network and Telecommunications Research Group. Trinity College, Ireland, Mar. 14-17, 2004.

R. Rao & S. Singhal, P2P-IM: A P2P Presence System for the Internet, Seventh IEEE International Conference on Peer-to-Peer Computing, published Sep. 2-5, 2007.

J. Walkerdine, L. Melville & I. Sommerville, Designing for Presence within P2P Systems, Lancaster University, Lancaster, UK, 2004.

O. Rantapuska, E. Kokkonen & J. Kinnunen, Grassroots Group Communication Inside Peer-to-Peer Mobile Communities; The 17th Annual IEEE International Symposium on Personal, Indoor and Mobile Radio Communications (PIMRC'06), Sep. 11-14, 2006.

EP Communication pursuant to Article 94(3) EPC, EP09157612.4, Feb. 21, 2011.

European Patent Office, "Communication pursuant to Article 94(3) EPC" for European Patent Application No. 09157612.4, dated Feb. 21, 2013, Germany.

Nakra, Suchita—Canadian Intellectual Property Office, "Examiner's Requisition" for Canadian Application No. 2,697,981 dated Jan. 29, 2014.

NPL-4. FieldCast: Peer-to-Peer Presence Information Exchange in Ubiquitous Computing Environment, IEICE Trans Int Syst (Inst Electron Inf Commun Eng) http://sciencelinks.jp/j-east/article/200502/000020050204A0909131.php.

NPL-5. Mobile Peer-to-Peer Media and Presence Community http://ieeexplore.ieee.org/stamp/stamp.jsp?arnumber=4446587&isnumber=444629, Jan. 12, 2008

NPL-6. Instant Messaging & Presence Management in Mobile Ad-Hoc Networks https://www.cs.tcd.ie/~omahony/MP2P_01_Greene_D.pdf, March 17, 2004.

* cited by examiner

METHOD, SYSTEM AND MOBILE DEVICE FOR IMPLEMENTING A SERVERLESS PRESENCE SYSTEM

TECHNICAL FIELD

The present disclosure relates generally to mobile communications and more particularly to a method, system and mobile device for implementing a serverless presence system.

BACKGROUND

Presence refers to a user's ability and/or willingness to participate in communications. Presence information, referred to as presence status or presence state, provides an indication of presence. Examples of general presence information are whether a mobile communication device is on or whether the mobile communication device is in communication with a wireless network (e.g., whether the mobile communication device is in coverage area).

Traditionally, presence information is managed by a presence server. When updating presence information, each mobile communication device which shares presence information with the presence server is periodically polled by the server to obtain its current presence status. Alternatively, changes in presence states may be pushed from the mobile communication devices to the presence server. Changes in presence status are then sent to each device in a group of mobile communication devices which share presence information (e.g., as determined by the respective device users). However, a presence server requires its own hardware, infrastructure, overhead and administration adding to the total cost of ownership. There are also privacy concerns with presence servers in regards to how access to presence information is controlled. Thus, there remains a need for improved presence systems.

BRIEF DESCRIPTION OF THE DRAWINGS

Like reference numerals are used in the drawings to denote like elements and features.

DETAILED DESCRIPTION OF EXAMPLE EMBODIMENTS

The present disclosure provides a method and system in which mobile communication devices within a predefined group to manage and share presence information among themselves without a dedicated presence server (sometimes referred to as peer-to-peer presence), as well as mobile communication devices which are configured to manage and share presence without a dedicated presence server.

In accordance with one embodiment of the present disclosure, there is provided a method of sharing presence information between a group of mobile communication devices configured to communicate over a wireless network, the mobile communication devices defining the group members of the group, the method comprising: sending a data packet from a sending group member to at least one of the other group members; determining a presence status in accordance with whether a delivery acknowledgement is received by the sending group member from each of the other group members to which the data packet was sent within a predetermined duration from the sending of the data packet; storing the determined presence status in memory; and sending a presence update comprising the determined presence status of at least some of the group members to all of the group members In accordance with another embodiment of the present disclosure, there is provided a mobile communication device, comprising: a controller for controlling the operation of the device; a communication subsystem connected to the controller configured for at least data communication with a wireless network; the controller being configured for sending a data packet from a sending group member to at least one of the other group members, determining a presence status in accordance with whether a delivery acknowledgement is received by the sending group member from each of the other group members to which the data packet was sent within a predetermined duration from the sending of the data packet, storing the determined presence status in memory, and sending a presence update comprising the determined presence status of at least some of the group members to all of the group members.

In accordance with yet further embodiments, there are provided computer readable mediums having stored thereon executable instructions (e.g., program code) for controlling the above-mentioned mobile communication devices, the executable instructions causing the communication devices to perform the methods described herein.

Figure 1:
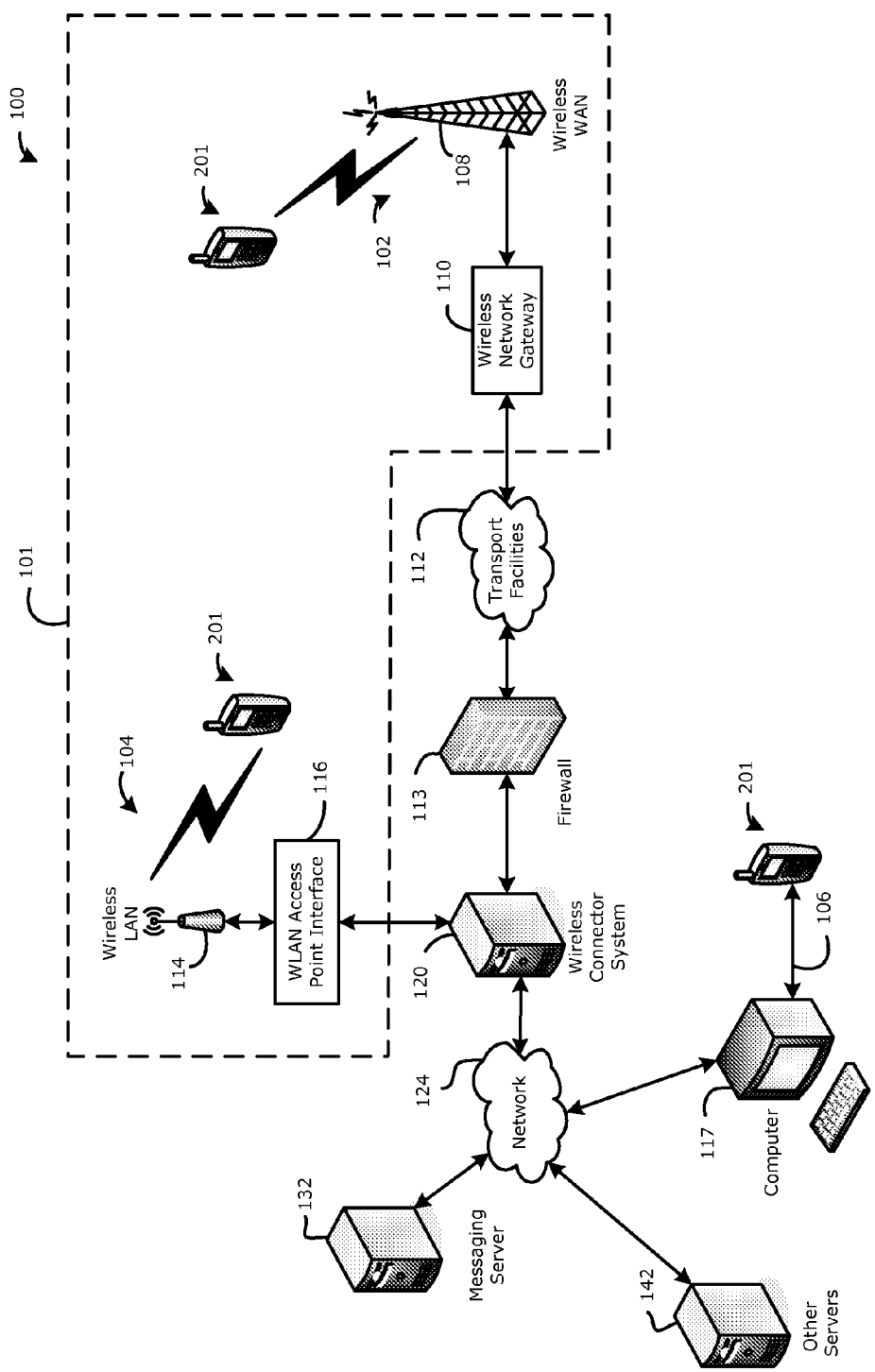
FIG. 1 is a block diagram illustrating a communication system including a mobile communication device to which example embodiments of the present disclosure can be applied.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) inter-face 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) and optionally other servers 142. The other servers 142 may comprise a content server for providing content such as internet content or content from an organization's internal servers to the mobile communication devices 201 in the wireless network 101, and an application server for implementing server-based applications such as instant messaging (IM) applications.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the messaging server 132, content server 132 or application servers 136. Conversely, the wireless connector system 120 sends data packets received, for example, from the messaging server 132, content server 132 or application servers 136 to the Wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, content server 132 and application server 136.

The network 124 may comprise a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
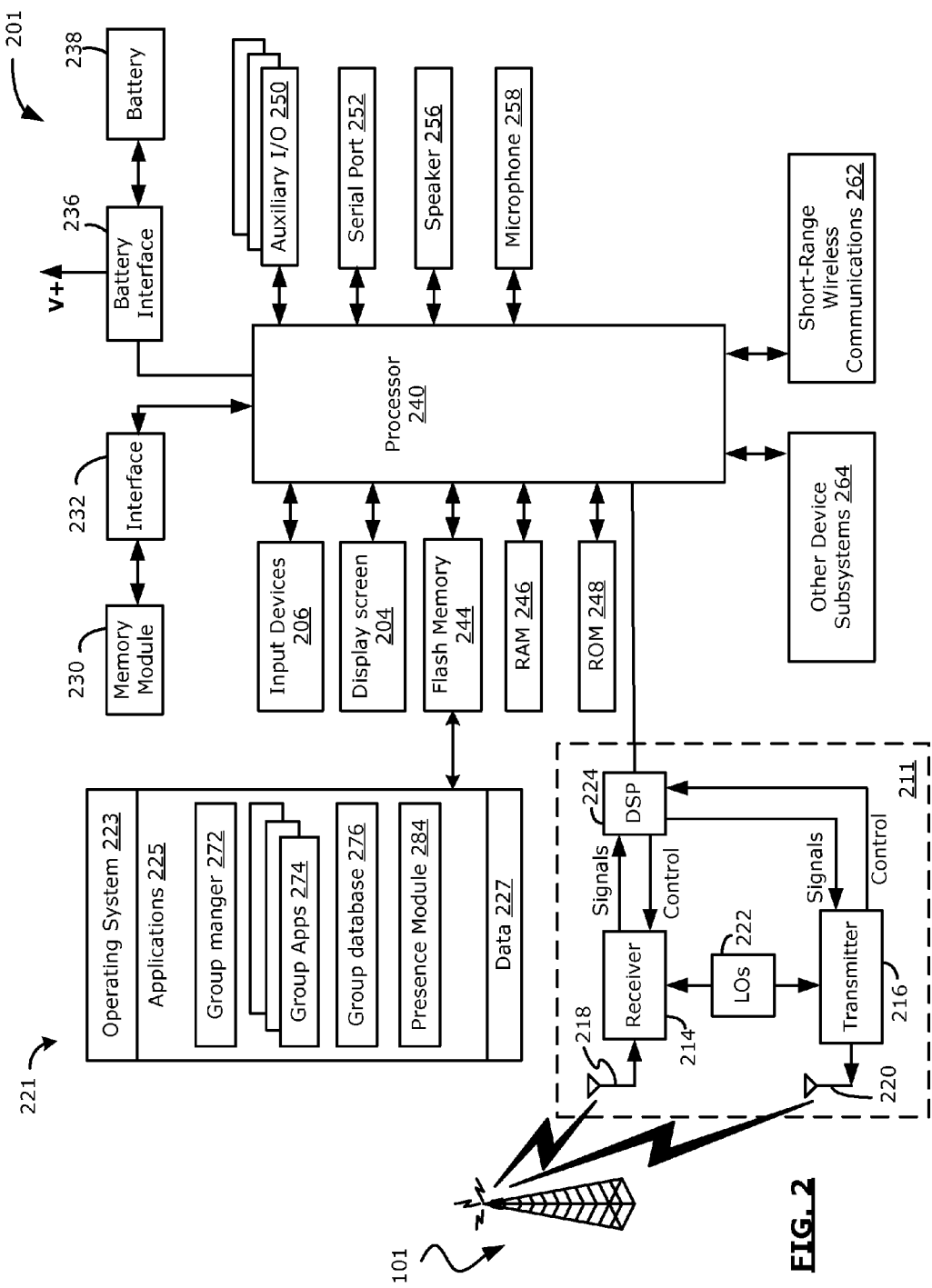
FIG. 2 is a block diagram illustrating a mobile communication device in accordance with one example embodiment of the present disclosure.

Reference is now made to FIG. 2 which illustrates a mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations 108 of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising a group application manager 272, group applications (or applets) 274, a group application database 276, and a presence module 284. The group application manager 272, group applications 274, group application database 276 and presence module 284 are typically implemented together as part of a stand-alone software application, but could be implemented as a part of the operating system 223 or other application 225 or as separate applications. In some example embodiments, the functions performed by each of the modules 272, 274, 276 and 284 may each be realized as a plurality of independent elements, and any one or more of these elements may be implemented as parts of other software applications 225. The group application database 276 could be stored with the other data 227 in other embodiments.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may include a range of applications, including, for example, an email messaging application, address book, calendar application, notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card 230 (typically comprising flash memory) and a memory card interface 232. Network access typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile device 201 by providing for information or software downloads to the mobile device 201 other than through the wireless network 101. The alternate download path may, for example, be used to load an encryption key onto the mobile device 201 through a direct, reliable and trusted connection to thereby provide secure device communication.

In some embodiments, the mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

Figure 3:
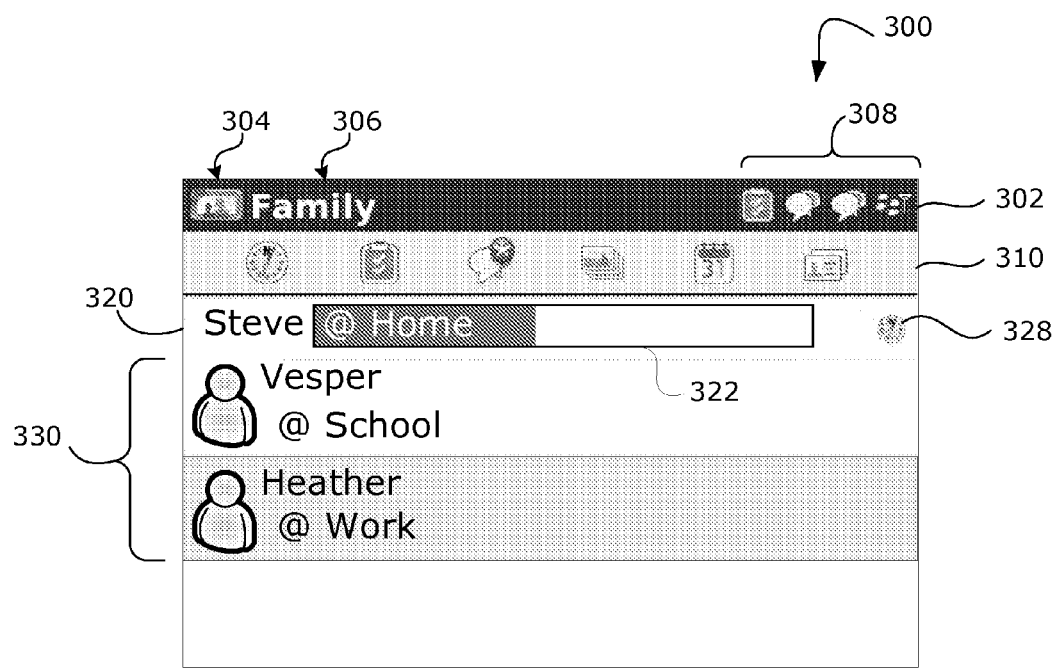
FIG. 3 is a screen shot illustrating an example user interface screen of a group application manager providing presence information in accordance with one example embodiment of the present disclosure.

Referring now to FIG. 3, an example user interface screen for displaying presence status will be described. FIG. 3 illustrates an example main user interface screen 300 of the group application manager 272. The main screen 300 includes a status bar 302 having a group icon and group name of an associated group. The status bar 302 also includes a notification area 308 in which new data notification icons and a wireless coverage indicator icon are displayed. The main screen 300 also includes an application bar 310 in which icons for switching to a respective group application 274 are displayed. Activation of a respective icon in the application bar 310 causes the respective group application 274 to become the active group application. The application bar 310 includes icons for the group applications 274 which, in the shown embodiment, comprise a location application, list application, conversation application (e.g., chat application), photo application, calendar application, and contact application (shown left to right in FIG. 3).

The main screen 300 also includes a user status field 320. The user status field 320 is a text entry field 322 into which the user may enter information to be shared with other group members similar to a status update used in social networking applications. The information which may be entered into the text entry field 322 is limited in length so as to be relatively short, and in some embodiments is limited to text having a length of up to 140 characters. The information entered in the text entry field 322 is shared with the other members of the group. Group applications 274 managed by the group application manager 272 may contribute further information to the user status field 320 such as the user's current location which may be contributed by the location application. In the shown embodiment, a location icon 328 is provided adjacent to the user status field 320. Activating the location icon 328 by corresponding input causes the location application to be invoked and a corresponding user interface screen to be displayed on the display screen 204. The location application displays the device user's location and the location of other group members on a map displayed on the user interface screen. The location application also allows locations on the map to be named. When the device user or group member arrives at or near a named location as determined using GPS or triangulation via base station locations, the location application updates the device user or group member's status to reflect the current location, by appending "@<location>" to the device user or group member's status. In other embodiments, location may be defined by the device user, possibly via the text entry field 322. In the shown embodiment, the device user's name and location information are provided in the user status field 320. In the example user interface screen shown in FIG. 3, the user name "Steve" and the status location "@ Home" are displayed. In other embodiments, no location information is provided.

The main screen 300 also includes a list 330 of all members of the group with each member having a respective status area (or field) in the list 330. For each member in the group, a group member name (e.g., of the respective device user), presence status and optionally location information are provided. Location information about group members, when provided, may be determined as described above. In the shown example, there are two group members "Vesper" and "Heather" in the list 330. Vesper has a location of "@ School" whereas Heather has a location of "@ Work". In addition, the presence of each group member is indicated by the background colour of the respective group member's status area. In the shown embodiment, a grey status area indicates that the respective group member is not available (or offline), whereas a white status area indicates that the respective user is available (or online). In the shown example, "Vesper" is available (online) whereas Heather is not available (offline). The indicated (e.g., displayed) presence status is based on stored values maintained by the presence module 284 as described above.

The indication of presence status is not intended to be limited to any colour scheme of the group member status area, and different colour schemes may be used to indicate presence status in other embodiments. Moreover, the colour of the text within the respective group member status area may be changed in addition to, or instead of, the background colour using a suitable colour scheme.

In yet other embodiments, presence status could be indicated by other means such as a corresponding icon, text label or both, in addition to, or instead of, changing the colour of the group member status area. For example, in some embodiments an antenna icon with a red X through it, or beside it, is displayed in the group member's status area when the respective group member is not available. A different icon could be used in different embodiments. In contrast, no icon is displayed in the group member's status area when the respective group member is available. This scheme uses "available" as a default presence status as this tends to be the normal circumstance. Thus, a notification icon is only displayed when a group member is not available. This reduces onscreen notifications and avoids cluttering the user interface screen. A notification icon may be used in addition to, or instead of, changing the colour of the group member status area.

In other embodiments, a first icon may be used when a group member is available and a second icon which is different than the first icon may be used when the group member is unavailable. The first and second icons may have a different pictorial representation, colour, or both. In some embodiments, the first icon may be green to indicate a group member is available and the second icon may be red to indicate that a group member is unavailable.

A user's own presence status is typically indicated in the notification area 308 by the wireless coverage indicator icon. In some embodiments, when the user is available (e.g. in a wireless coverage area) the wireless coverage indicator icon is an antenna icon displayed in the notification area 308. When the user is not available (e.g., out of a wireless coverage area) the wireless coverage indicator icon is an antenna icon with an X (possibly a red X) is displayed in the notification area 308. However, it is possible that a user's presence status could be displayed in the user status field 320 in addition to, or instead of, the notification area 308 in a manner similar to the group member presence status. In such cases, the source of the user's presence status displayed in the user status field 320 would likely be based on whether the mobile device 201 is in communication with the wireless network 101 as determined by the wireless communication subsystem 211 rather than the operations 400 described below, or possibly a user defined presence status.

While group member presence status has been described in the context of an example main screen 300, it will be appreciated that other screen layouts for the main screen 300 are possible and that presence status may be shown in different ways in different user interface screens. Moreover, it will be appreciated that presence status may be provided in other user interface screens of the group application manager 272 such as, for example, in the user interface screen of a group application 274 such as the conversation application or location application. Any group application 274 which provides a group member status area may be configured to provide an indication of the respective group member's presence status, for example by changing the colour of the background of the respective field, changing the colour of the text, changing a representative icon, or any combination thereof, to correspond to the current presence status of the respective group member. Group applications 274 may also choose to use textual representations of a group member's presence status. For example, in a conversation application, a change in a group member's presence status may result in the addition of a message inline with the existing conversation messages that conveys information about the group member's new presence status (saying, for example, "Vesper is now online").

Figure 4:
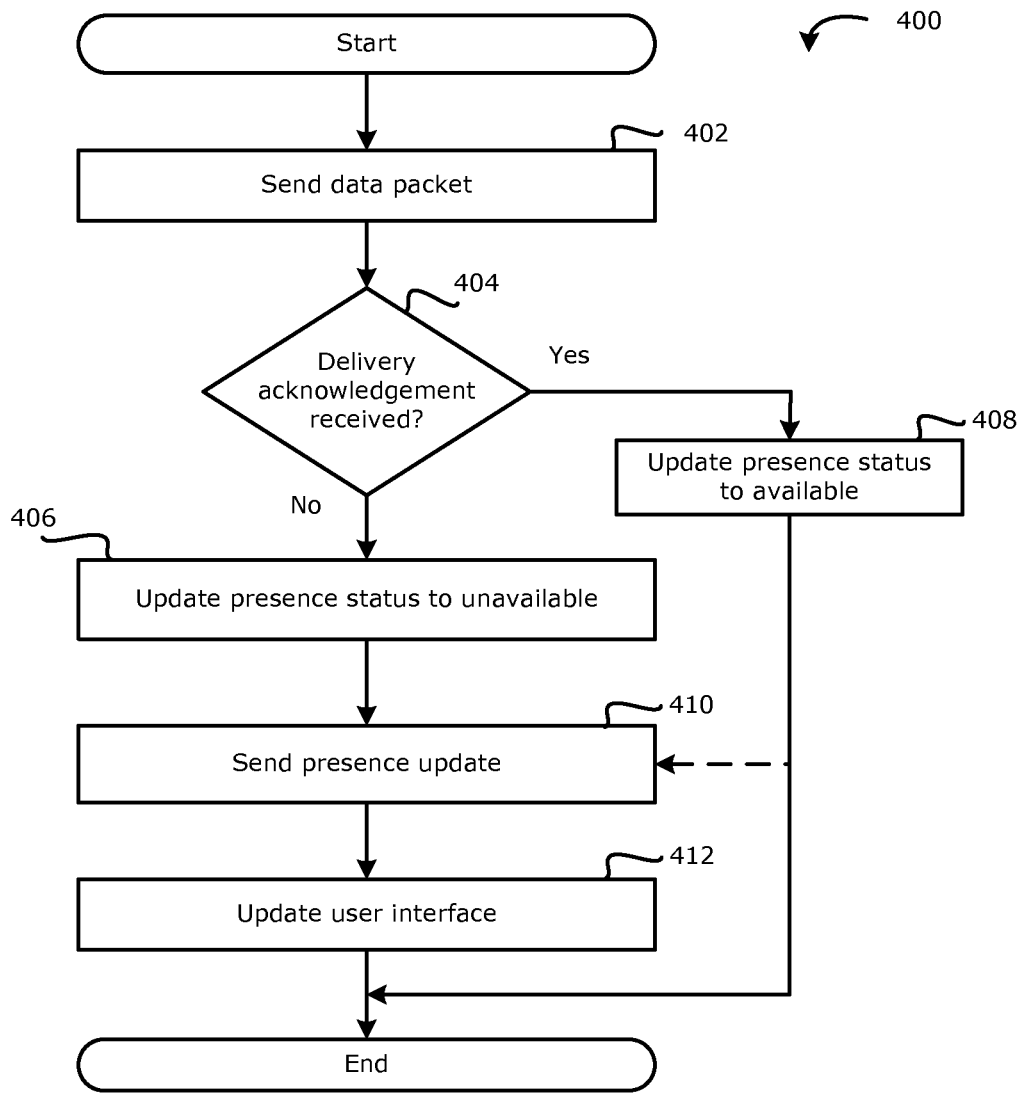
FIG. 4 is a flowchart illustrating an example method of sending presence updates to a predefined group of mobile communication devices in accordance with one example embodiment of the present disclosure.

Referring to FIG. 4, one embodiment of a method of sending presence updates within a predefined group of mobile communication devices in accordance with one example embodiment of the present disclosure will be described. The method is implemented by operations 400 which are performed by the processor 240 of the mobile device 201 under the instruction of the presence module 284 and/or group application manager 272. The illustrated operations 400 are for one mobile device in the group (the sending group member) which sends a presence update. The responses which occur on other mobile devices 201 in the group (the other group members) will be appreciated by persons skilled in the art and are described below.

The presence module 284 manages presence status and provides the group application manager 272 with access to the presence status of group members, for example, for use in group applications which are part of, or connected to, the group application manager 272. In some embodiments, the presence module 284 may be part of the group application manager 272. The presence module 284 maintains, for each predefined group, a list 330 of the group members of each respective group along with the presence status of the respective group members (typically excluding the device user's own presences status). Each group member is identified in the list 330 by a respective user name. In some embodiments, each group member is identified by a respective user name (e.g., Heather or Vesper) and one or both of a personal identification number (PIN) (which is typically not displayed) and a digital image (e.g., thumbnail or avatar). The PIN may be a globally unique number that identifies the mobile device 201 to the device manufacturer and/or between device manufacturers. The PIN could alternatively be any other data which allows for the unique identification of a device or the device's user, such as an permanent or relatively permanent IP Address (for example, in accordance with Internet Protocol version 4 (IPv4) as described in RFC 791 and/or Internet Protocol version 6 (IPv6) as described in RFC 2460) or an International Mobile Equipment Identity (IMEI) for example. The presence status stored by the presence module 284 could also be shared with the operating system 223 and/or other applications 225 on the mobile devices 201 in some embodiments, for example for providing an indication of presence status in other applications 225 or user interface screens of the mobile devices 201, or in (re)directing communications to the mobile devices 201.

In some embodiments, the operations 400 may be performed in the background even when the group application manager 272 is not the active application 225. In such cases, the user interface of the devices 201 is only updated when the main user interface screen 300 or other user interface screen providing an indication of presence status of the group members is displayed on the display screen 204.

The group application manager 272 manages groups and group membership among other functions. Each group has a number of group members. The basis for forming such groups is known in the art and will not be described in detail herein. However, it will be noted that in at least some embodiments more than one group may be defined and a given mobile device 201 may be a group member in more than one group. For example, a predefined group may be a group of mobile devices 201 belonging to users in the same family. The present disclosure primarily describe group members in terms of mobile devices 201, however, groups could be defined in terms of device users. Thus, the term group member can be applied equally to mobile devices 201 and the respective device users associated with such mobile devices 201.

The method utilizes delivery acknowledgements (also known as delivery receipts) as a basis for presence status. Delivery acknowledgements are device level messages (rather than messages meant for display) sent by the wireless connector system 120 (FIG. 1) of the wireless network 101 (FIG. 1) for each mobile device recipient for which a data packet such as an electronic message (e.g., electronic mail (email) message or peer-to-peer message) was successfully delivered. The delivery acknowledgements are typically sent by the wireless connector system 120 in response to an acknowledgement from the receiving mobile device 201. For example, if an email message is sent to three recipients A, B, and C, a corresponding delivery acknowledgement is sent by the wireless connector system 120 to the sender of the email message when it has been delivered to each of A, B and C (i.e., 3 delivery acknowledgements are sent, one for each A, B and C). In other embodiments, the delivery acknowledgements could be sent by a component of the wireless network 101 different than the wireless connector system 120

Delivery acknowledgements may also be sent to the sending mobile device 201 by receiving mobile devices 201 in response to receipt of a peer-to-peer data packets such as a peer-to-peer message (also referred to as a device-to-device message or PIN message) from the sending mobile device 201 rather than the wireless connector system 120. The delivery acknowledgements sent by receiving mobile devices 201 may differ in form and/or content from those sent by the wireless connector system 120; however, the differences do not affect the operations 400 and will not be described herein.

Delivery acknowledgements typically occur and are processed at the transport layer of the device communication protocol stack and are not displayed on the display screen 204. However, delivery acknowledgements could occur at a different layer in the device communication protocol stack in other embodiments. When a delivery acknowledgement is received for a recipient within a predetermined duration, this indicates that the mobile device 201 is in communication with the wireless network 101. The predetermined duration could be, for example 5 or 10 seconds, but may be any defined time period.

When data packets are not delivered because the mobile device 201 to which the data packets were to be delivered was out of communication with the wireless network 101 (e.g., out of a wireless coverage area, powered off, or otherwise unable to receive the data packets), the data packets are queued for delivery by the wireless connector system 120, typically but not necessarily in the order received, and as a result no delivery acknowledgements are sent to the senders of the queued data packets. When the mobile device 201 re-establishes communications with the wireless network 101 (e.g., returns to a wireless coverage area, is powered on, etc.), the queued data packets are then delivered to the mobile device 201 by the wireless connector system 120, and once the mobile device 201 has received them, the corresponding delivery acknowledgements are sent to the senders of the queued data packets.

In the first step 402, a data packet is sent from the mobile device 201 of one member of the group (the sending mobile device) to one or more group members of the group (the other group members). The sender could be any member of the group. In some embodiments, the data packet is sent from one of the group applications 274 managed by the group application manager 272 such as the location application, list application, conversation application, photo application, calendar application, or contact application shown in the application bar 310 of the example main user interface screen 300 of the group application manager 272 shown in FIG. 3.

In at least some embodiments, whenever a local change is made by a group application 274 that change is made to the group application database 276. The change could be any change in respect of a group application 274, such as a new message in a conversation, a new or changed calendar item, a new or changed list, a change in mobile device location, or the addition of a new photo. In response to a local change in the group application database 276, corresponding changes are required in the group application database 276 of the corresponding group member with which the information is shared.

Depending on the group application 274 and the particular change which occurred, the change may relate to information shared with all group members or only select group members. For example, some information may be "private" and shared between only selected members of the group (e.g., parents when the group defines a family) while other information may be "public" and shared with all members of the group (e.g., all members of the family). Shared content in the group application database 276 is synchronized between group members so that each group member has an up-to-date version of the shared content. This creates a mirrored copy of the shared content of the group application database 276 in the memory 244 of each group member with whom that data is shared. To implement private and public data (i.e., selectively shared content), multiple group application databases 276 may be used, for example one public database for public information and one private database for each group member for private information shared between the device user and that group member. The structure of the group application database 276 is not relevant to the present disclosure and so will not be described in detail herein.

In response to a change in the group application database 276, the group application manager 272 or the associated group application 274 causes a content update data packet be sent to the group members with whom the changed data is shared. The content update data packet comprises the content which requires updating. The content update data packet is recognized by receiving mobile devices 201 via the group application manager 272, the associated group application 274, or both, typically by header information and possibly the format or other aspects of the content update data packet. On receiving and processing the content update data packet, recipient mobile devices 201 update a respective local group application database 276 in accordance with the new or changed content of the content update data packet. Alternatively, the content update data packet could include explicit instructions to update the content of the local group application database 276 on recipient mobile devices 201 in addition to the content to be updated.

The content update data packet is typically sent at the transport layer. In response to receiving a content update data packet, the group application manager 272 or the associated group application 274 of the receiving mobile device 201 makes a corresponding change in its group application database 276. A corresponding notification or other user interface change may then be displayed on the receiving mobile device 201 in the main user interface screen 300 of the group application manager 272, the user interface screen of the associated group application 274, or possibly another user interface screens displayed on the mobile device 201.

In other embodiments, the data packet may be sent from an application 225 (e.g., email messaging application) on the sending mobile device 201 which is not a group application 274 managed by the group application manager 272. The data packet could be any electronic message sent from a corresponding messaging application on the sending mobile device to the one or more group members of the group via the wireless network 101 including, but not limited to, an email message, Short Messages Service (SMS) text message, Multimedia Message Service (MMS) message, chat message, IM message, or peer-to-peer message.

In yet other embodiments, the data packet may be a ping sent from the sending mobile device 201 to the other members in the group. The ping is sent from one mobile device 201 to the other members in the group at a predetermined time interval. In some embodiments, the predetermined time interval could be every 15 minutes. The responsibility for sending the ping is shared between group members using a predetermined scheduling algorithm. In some embodiments, responsibility for sending the ping is equally shared between group members using a round-robin scheduling algorithm. As will be appreciated by persons skilled in the art, in round-robin scheduling each mobile device 201 in the group takes an equal turn in sending the ping to other members of the group. Other scheduling algorithms could be used in other embodiments. For example, the active group member may change at predetermined intervals (e.g., 15 minutes) in a predetermined order which could be based on the numerical order of the PIN of the group members.

For purposes of illustration, consider four mobile devices 201 in a group (e.g., mobile devices 201 belonging to four family members) using a round-robin scheduling algorithm. At a first 15 minute internal, the first mobile device 201 (the active group member) sends the ping. At the second 15 minute interval, the second mobile device 201 sends the ping. At the third 15 minute interval, the third mobile device 201 sends the ping. At the fourth 15 minute interval, the fourth third mobile device 201 sends the ping. In this example, compared to known solutions in which each mobile device 201 is responsible for polling other mobile devices 201 in a group and maintaining its own presence information, the number of data packets which are sent is reduced by ¾. In some embodiments, the ping may be sent to all of the other group members regardless of the data packets which may have been received by the other group members. In other embodiments, the ping is only sent to group members for whom the active group member has not received a data packet within the predetermined time interval for sending pings. This allows the number of pings sent to be reduced, reducing the number of data packets even further. In some embodiments, the last time that a data packet was received may be maintained by each group member and used to determine whether to send a ping to the respective group member. The time may be stored by the presence module 284 in association with presence status in memory 244.

The predetermined scheduling algorithm is stored and used by each mobile device 201 in the group so that the "active" group member responsible for sending the ping can be determined independently by each group member. The predetermined scheduling algorithm may select group members based on the PIN of the mobile devices 201 or other unique identifier.

The ping may be sent from one mobile device 201 to the other members in the group at the predetermined time interval in accordance with the predetermined scheduling algorithm regardless of the activity of group members, or the ping may only be sent when there is no other activity between the group members. To implement the later option, the ping may be sent by the active group member when it has not received any data packet or a predetermined type of data packet from all of the other group members within the predetermined time interval. In such embodiments, the predetermined time interval functions as a duration of a countdown timer for the sending of ping messages. In some embodiments, when the active group member receives a predetermined type of data packet from each of the group members, this could re-set the countdown timer for the sending of ping messages. The re-setting of the countdown timer could be independent of the selection of the active group member, or could trigger a change in the active group member. In other embodiments, no ping messages are sent and the operations rely executively on other activity between the group members. Thus, pings may be sent (i) irrespective of other activity between group members, (ii) only if there is no other activity between group members, or (iii) not at all, depending on the embodiment. Whether pings are used and the manner in which pings are used, if at all, could be configurable via a device setting in some embodiments.

The ping may include the PIN of the sending device and possibly location information describing the location of the mobile device 201, for example, based on one or both of triangulated location based on nearby base station location information determined by a wireless communication subsystem 211 of the mobile device 201 or provided by the wireless network 101, or GPS location information from a GPS subsystem of the mobile device 201, depending on the embodiment and the device components. The location in the ping could be provided instead of, or in addition to, the location provided by the location application as described above.

The active group member responsible for sending the ping can be determined independently by each group member using the predetermined scheduling algorithm and the identification of the last mobile device 201 (e.g., by PIN) in the group to send the ping. Each mobile device 201 in the group awaits the ping from the group member responsible for sending the next ping. If a ping is not received within a first predetermined duration of the scheduled time (e.g., based on the predetermined time interval and the time the last ping was sent or received), the next group member in accordance with the predetermined scheduling algorithm becomes the active group member and sends the ping. The first predetermined duration could be a fixed duration which may be few seconds up to a few minutes. In some embodiments, the predetermined duration could be 30 seconds. In other embodiments, the predetermined duration may be expressed as a percentage of the scheduled time. In some embodiments, the predetermined duration could be 10% of the scheduled time. For example, if the ping is "overdue" by a length of time equal to 10% of the scheduled time, then the next group member sends the ping.

If the next group member is out of communication with the wireless network 101, the ping will not be sent or received by the other group members. Accordingly, if the ping is not received within a second predetermined duration of the scheduled time, the next group member in accordance with the predetermined scheduling algorithm becomes the active group member and sends the ping. The second predetermined duration is longer than the first predetermined duration, and could be a few seconds up to a few minutes. The second predetermined duration could be twice the first predetermined duration, e.g. 60 seconds or 20% of the scheduled time. The selection process for the active group member can be repeated for each group member until a ping is received, i.e., when a group member in communication with the wireless network 101 becomes the active group member. Thus, the $n^{th}$ predetermined duration for the $n^{th}$ group member selected in accordance with the predetermined scheduling algorithm could be n times the first predetermined duration, e.g. n times the fixed duration or n times the percentage of the scheduled time. This implementation scales relatively well in that the group member at position n in the predetermined scheduling algorithm knows when to take over if the ping from the previous group member in the predetermined scheduling algorithm is overdue by n times the first predetermined duration. When all group members are out of communication with the wireless network 101 at the same time, the selection process may loop through the predetermined scheduling algorithm until one of the group members re-establishes communication with the wireless network 101, becomes the active group member and successfully sends the ping.

Next, in step 404 the sending device 201 determines whether a delivery acknowledgement has been received for each group member to which the data packet was sent. The delivery acknowledgement may vary in form, content, or both, depending on the type of data packet which was sent in step 402. The delivery acknowledgement may be received in respect of a data packet sent from a group application 274, an application 225, or a ping message. If a delivery acknowledgement is not received by the sending mobile device 201 for each group member to which the data packet was sent within a predetermined duration, the group members for whom a delivery acknowledgement was not received are determined to be unavailable (e.g., out of communication with the wireless network 101). The predetermined duration could be a few seconds up to a few minutes. In some embodiments, the predetermined duration could be 30 seconds. Operations then proceed to step 406 in which the presence status stored in the memory (e.g., the flash memory 244, or possibly the RAM 246) of the sending mobile device 201 is updated and set to unavailable for each group member to whom the data packet was sent and for whom a delivery acknowledgement was not received.

If a delivery acknowledgement is received by the sending mobile device 201 for each group member to which the data packet was sent within the predetermined duration (step 404), the respective group members are determined to be available (e.g., in communication with the wireless network 101). Operations then proceed to step 408 in which the presence status stored in the memory 244 of the sending mobile device 201 is updated and set to available for each group member to whom the data packet was sent and for whom a delivery acknowledgement was received. Depending on the embodiment, if the delivery acknowledgement of one or more group members includes location information, the location of the respective group members may be stored in memory 244, for example in association with the presence status maintained by the presence module 284.

Next, in step 410 in response to one or more of the group members being unavailable, and after updating the presence status, the sending mobile device 201 sends a presence update to all of the other members of the group. The presence update is typically a data packet which is recognized by receiving mobile devices 201 via the group application manager 272, the associated group application 274, or both, typically by header information and possibly the format or other aspects of the presence update data packet. On receiving and processing the presence update data packet, recipient mobile devices 201 update the presence status stored in respective local presence modules 284 in accordance with the presence status of the presence update data packet. Alternatively, the presence update data packet could include explicit instructions to update the presences status of the local presence module 284 on recipient mobile devices 201 in addition to the presence status to be updated.

In some embodiments, the presence update data packet indicates which group members are not available in accordance with the presence status stored in the presence module 284 of the sending mobile device 201. In these embodiments, the implicit understanding of the group members (i.e., recipient mobile devices 201) is that other group members are available if a presence status was not specific in the presence update data packet. This reduces the amount of data which needs to be transmitted in order to maintain presence status. In other embodiments, the presence update data packet could include the presence status only group members who are currently available rather than unavailable.

In yet other embodiments, the presence update data packet could include the presence status for all group members stored in the presence module 284 on the sending mobile device 201 as indicated by the dashed line, rather than only including the presence status for those group members who are currently unavailable. This provides explicit presence status for all group members at the expense of an increase in the amount of data which needs to be transmitted in order to maintain presence status.

In yet other embodiments, regardless of whether presence status is explicitly provided in the presence update data packet as available, unavailable, or both available or unavailable, group members whose presence status is not known will not be included in the presence update data packet. In these embodiments, a receiving group member will not update the presence status for any group member unless it is explicitly provided in the presence update data packet.

The presence update data packet is typically a data packet sent at the transport layer of the device communication protocol stack. However, presence update data packet could occur at a different layer in the device communication protocol stack in other embodiments. The presence update data packet, when received by the other members of the group, causes the presence status to be updated in the local memory of recipient mobile devices 201 to match the updated presence status in presence update data packet.

In other embodiments, the presence update data packet is sent even when all group members are available rather than only when one or more of the group members are unavailable. This provides explicit presence status at regular intervals at the expense of an increase in the amount of data which needs to be transmitted in order to maintain presence status.

In yet another embodiment, the presence update packet is not sent when all group members are determined to be available, or their presence status is unchanged. This allows recipient mobile devices 201 to infer a presence status for each member of the group with reduced data transmission.

Next, in step 412 the indication of presence status displayed on the display screen 204 of the mobile devices 201 of the sender and other group members is updated to reflect the updated presence status. In some embodiments, step 412 comprises (re)displaying a user interface screen on the display screen 104 of the sending group member to provide an indication of the presence status of the group members within the respective group member status areas in accordance with the stored presence status. The (re)displaying could be in response to corresponding input on the sending group member. The presence status may be indicated by a background colour of the group member status area, a text colour of the group member status area, a presence status icon displayed in the group member status area, or any combination thereof.

Typically, step 412 involves (re)displaying/updating the main user interface screen 300 of the group application manager 272. However, the presence status could also be updated in other user interface screens of the mobile devices 201 which provide an indication of presence status of the group members. If the main user interface screen 300 or other user interface screen providing an indication of presence status is not displayed on the display screen 204 when the presence update data packet is received, then the updated presence status will be displayed when the corresponding user interface screen is next displayed. The user interface could alternatively be updated after updating the presence status in step 406 and before step 410.

Figure 6:
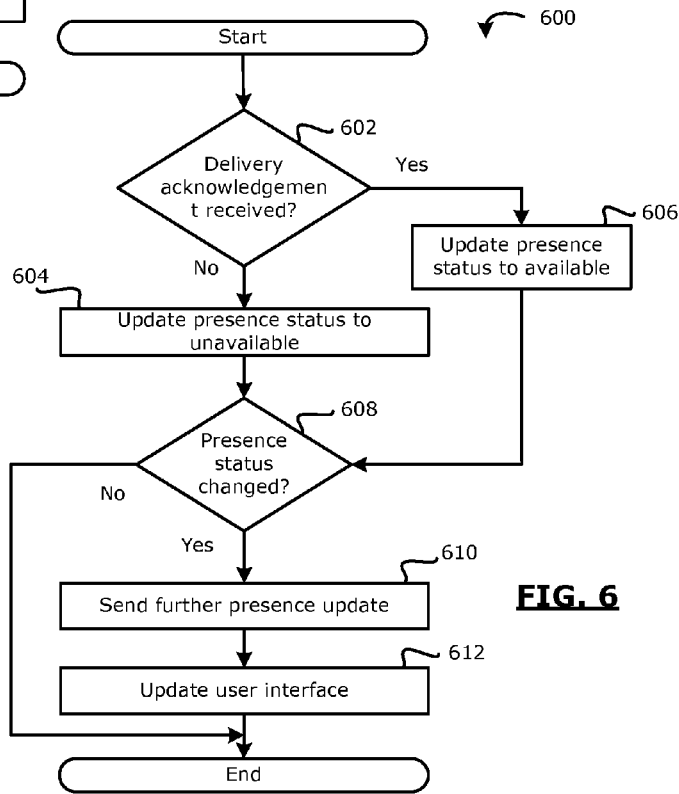
FIG. 6 is a flowchart illustrating optional steps which may be performed when sending presence updates to a predefined group of mobile communication devices in accordance with the method of FIG. 4.

FIG. 6 is a flowchart illustrating operations 600 which comprise optional steps which may be performed when sending presence updates to a predefined group of mobile communication devices in accordance with the operations 400 of FIG. 4. After the sending the presence update data packet in step 410, or after updating the user interface in step 412, the sending mobile device 201 may optionally determine whether a delivery acknowledgement has been received in respect of the presence update data packet for each group member to which a presence update data packet is sent within a predetermined duration (step 602). The predetermined duration is typically the same as the predetermined duration in step 404. If a delivery acknowledgement is not received by the sending mobile device 201 for all group members within the predetermined duration, the group members for whom a delivery acknowledgement was not received are determined to be unavailable. Operations then proceed to step 604 in which the presence status stored in memory 244 on the sending mobile device 201 is set to unavailable for each group member for whom a delivery acknowledgement was not received.

In most cases, delivery acknowledgements will not be received from group members whose updated presence status from steps 406 indicates they are not available when the data packet in step 402 was sent to all group members (whether a ping or other data packet). However, if the data packet in step 402 was not sent to all group members, then a delivery acknowledgement may not be received from other members in the group to which the initial data packet in step 402 was not sent. It is also possible that the presence status of one or more group members has changed since it was determined in step 404, but this is likely seldom to occur given the short time in which the operations 400 occur.

If a delivery acknowledgement is received by the sending mobile device 201 for all group members within the predetermined duration, the group members for whom a delivery acknowledgement was received are determined to be available. Operations then proceed to step 606 in which the presence status stored in the memory of the sending mobile device 201 is updated and set to available for each group member to whom the data packet was sent and for whom a delivery acknowledgement was received.

Next, in step 608 the sending mobile device 201 determines whether the presence status of one or more group members has changed since it was determined in step 404. Alternatively, this determination can be made before updating presence status in steps 604 and 606. A further presence update data packet is sent when the presence status of one or more group members has changed (step 610). The further presence update data packet may have the same format and may be sent in the same manner as the presence update data packet in step 410 described above.

Next, in step 612 the indication of presence status displayed on the display screen 204 of the mobile devices 201 of the sender and other group members is updated to reflect the updated presence status. When the presence status of one or more group members has not changed since it was determined in step 404, no further presence update data packet is sent.

The operations 600 are optional and are not performed in all embodiments. In some embodiments, delivery acknowledgements for presence update data packet are not checked to reduce or eliminate looping operations when sharing and managing presence between group members in a peer-to-peer serverless presence system. This is sometimes referred to as a "fire and forget it" methodology.

Figure 5:
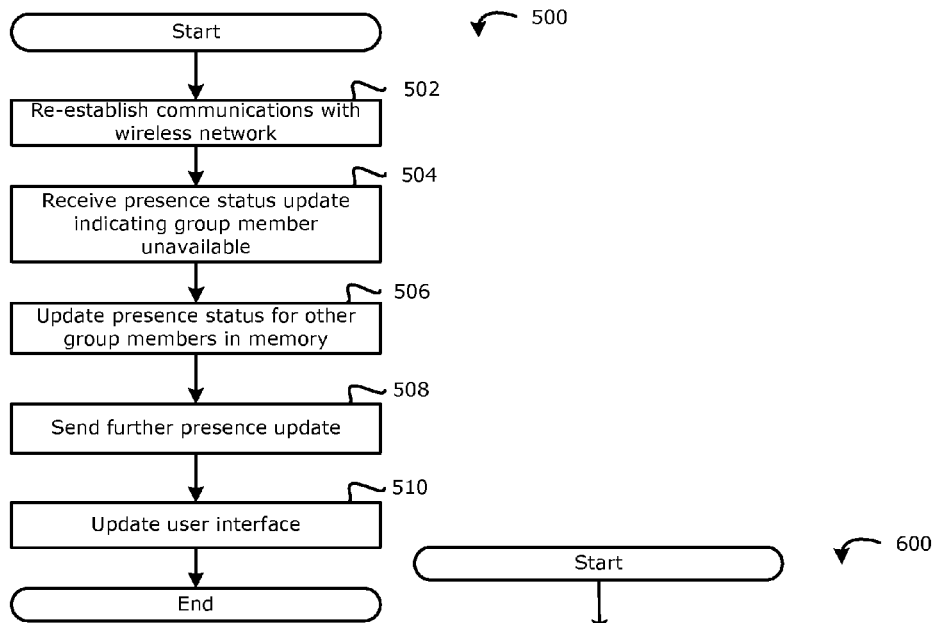
FIG. 5 is a flowchart illustrating an example method of updating presence within a predefined group of mobile communication devices when a previously unavailable group member becomes available in accordance with one example embodiment of the present disclosure.

Referring now to FIG. 5, one embodiment of a method of updating presence within a predefined group of mobile communication devices when a previously unavailable group member becomes available will now be described. The method is implemented by operations 500 which are performed by the processor 240 of the mobile device 201 under the instruction of the presence module 284 and/or group application manager 272.

In the first step 502, a group member who was previously unavailable becomes available. This occurs when the group member re-establishes communications with the wireless network 101 in response to returning to a wireless coverage area, powering on of the respective mobile device 201, re-activating the wireless communication subsystem 211, etc.

Next, in step 504 the group member receives a previous presence update data packet from one of the other group members which indicates that that group member is unavailable. As noted above, data packets which are not delivered when the group member was out of communication with the wireless network 101 will have been queued for delivery from by the wireless connector system 120 and will be delivered to the group member by the wireless connector system 120 when the group member becomes available. The queued data packets include presence update data packets sent in the operations 400.

Next, in step 506 the presence status stored in the memory (e.g., the flash memory 244) of the mobile device 201 is updated in accordance with the previous presence update data packet received in step 504. When "available" is used as default presence status, this comprises updating the presence status for each group members listed in the presence update data packet to unavailable. Updating using other configurations of presence status will be appreciated by persons skilled in the art upon review of the foregoing discussion.

Next, in step 508 the group member sends a presence update data packet to all of the other group members to update them that the group member is now available. It will be appreciated that, in at least this embodiment, it is the responsibility of previously unavailable group members to update the other group members as to their presence status when they become available. The presence update data packet sent in step 508, in some embodiments, includes the explicit presence status of "available" for the previously unavailable group member while not including the presence status of other group members because the presence status stored by the previously unavailable group member is out of date.

In other embodiments, the presence update data packet sent in step 508 includes the presence status of other group members. This is because, on returning to wireless coverage, the previously unavailable group member may receive presence updates from other group members. Thus, if the presence update data packet is sent after receiving and processing all queued data packets, then the presence status stored by the previously unavailable group member may be up to date.

In the above described embodiments, receiving group members will not update the presence status for any group member unless it is explicitly provided in the presence update data packet. The presence update data packet sent in step 508 typically only includes the explicit presence status of "available" for the previously unavailable group member, in which case, receiving group members will only update the presence status of the previously unavailable group member to available. This, presence status will not be update for other group members at this time. Delivery acknowledgements for presence update data packets sent in step 508 are typically not checked to reduce or eliminate looping operations (i.e., the data packets sent in step 508 are typically "fire and forget it" data packets).

The presence update data packet is recognized by receiving mobile devices 201 via the group application manager 272, the associated group application 274, or both, typically by header information and possibly the format or other aspects of the presence update data packet. On receiving and processing the presence update data packet, recipient mobile devices 201 updates the presence status stored in the local presence module 284 in accordance with the presence status of the presence update data packet. Alternatively, the presence update data packet could include explicit instructions to update the presences status of the local presence module 284 on recipient mobile devices 201 in addition to the presence status to be updated.

The presence update data packet is typically a data packet sent at the transport layer of the device communication protocol stack. However, presence update data packet could occur at a different layer in the device communication protocol stack in other embodiments. The presence update data packet, when received by the other members of the group, causes the presence status to be updated in the local memory of recipient mobile devices 201 to match the updated presence status in presence update data packet.

Next, in step 510 the indication of presence status displayed on the display screen 204 of the mobile devices 201 of the sender and other group members is updated to reflect the updated presence status. Typically this involves updating the main user interface screen 300, however, the presence status could also be updated in other user interface screens of the mobile devices 201 which provide an indication of presence status of the group members. If the main user interface screen 300 or other user interface screen providing an indication of presence status is not displayed on the display screen 204 when the presence update data packet is received, then the updated presence status will be displayed when the corresponding user interface screen is next displayed. The user interface could alternatively be updated after updating the presence status in step 506 and before step 510.

When a number of presence update data packets are queued by the wireless connector system 120, the operations 500 are typically repeated for each presence update data packet.

While the operations 400, 500 and 600 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments. It also should be noted that receiving the presence update data packets sent in any one or more of steps, 410, 508, 610, and possibly its contents of such data packets, may be used in evaluating whether to send a ping message in accordance with the operations 400. That is, receiving presence update data packets sent from other group members may be considered "other activity" which re-sets the countdown timer for the sending of ping messages.

Furthermore, while presence status has been described as being "available" or "unavailable", other binary presence status indicators could be used. Other suitable presence status indicators include "online" or "offline", "present" or "not present", "able to communicate" or "unable to communicate", and "in coverage" or "out of coverage". Presence status indicators need not be limited to text and may include a wide variety of data including creative statuses, such as a colour or an image, and user defined presence status which may be text-based or a visual representation. These presence status indicators are provided for purposes of illustration and are not intending to be limiting.

Compared to devices having wired or short-range wireless communication links (e.g., Wi-Fi™), mobile communication devices having long-range wireless communication links may lose communication with the communications infrastructure more frequently, i.e. lose coverage of the wireless network 101. Accordingly, the loss of communication with the wireless network 101 can provide a useful basis for presence status. The present disclosure uses delivery acknowledgements, an existing feature of the communications infrastructure of at least some wireless networks, to provide a basis for presence status without requiring any additional hardware or software on the wireless connector system 120 or other component of the wireless network 101.

The present disclosure provides a solution to sharing presence among members of a predefined group using communications sent to group members in the ordinary course, pings sent to group members, or both as the basis for presence status. This can be contrasted to known solutions in which each mobile device in the group polls other group members periodically and receives acknowledgments concerning the presence status of other group members. In contrast to known solutions, the solution taught by the present disclosure shares the processing burden among group members. While this solution requires software on the mobile devices 201 of each group, it does not require any hardware or software changes to the wireless connector system 120 or other component of the wireless network 101. The solution of the present disclosure is peer-to-peer and attempts to balance privacy concerns, administration costs, and the number of packets which are sent (i.e., reducing bandwidth consumption). Presence status data and other data shared by group members is not stored on a server or other component of the wireless network 101, except temporally during transmission of the data. Instead, presence status data and other data shared by group members is stored by the group members in the presence modules 284 and/or group application database 276. This solution may also improve the battery life of mobile devices 201 and decrease cost of sharing presence compared with known solutions by reducing the number of packets sent by each group member and any associated user data charges.

Moreover, the use of pings sent to all members of the group may obviate the need for pings to be sent from the wireless connector system 120 to mobile devices 201 in some embodiments. For example, GSM-based wireless networks 101 typically send pings to mobile devices 201 at predetermined time intervals in order to update the IP (internet protocol) address associated with the mobile devices 201 when there has been no communication with, or data exchanged with, the devices 201 during that interval. The predetermined time interval is typically measured from the last time a message was successfully sent and/or received by a device 201.

As will be appreciated by persons skilled in the art, in GSM networks each mobile device 201 is assigned an IP address for use in addressing the respective mobile device 201 for wireless communications. The assigned IP address may change with the location of the device 201, for example, as the device 201 moves between cells of the wireless network 101. The pings sent by the active group member in some embodiments may be used to transmit IP address to the wireless connector system 120, thereby resetting the predetermined time interval for the sending the ping from the wireless connector system 120. To eliminate or reduce the need to send ping from the wireless connector system 120 in some embodiments, the predetermined duration used by the group members when deciding to send pings may be set to be less than or equal to the predetermined time interval used by the wireless connector system 120 when deciding to send pings.

While the operations 400 have been described as using delivery acknowledgements sent by the wireless connector system 120, the teachings of the present disclosure could be applied to any delivery acknowledgement architecture. For example, the teachings of the present disclosure could be applied to delivery acknowledgements used between a messaging server and its corresponding messaging clients, such as a Microsoft Exchange™ server and Microsoft Outlook™ clients. Additionally, the teachings of the present disclosure could be applied to read receipts for data packets between a messaging server and its corresponding messaging clients, such as email message read receipts. It will be appreciated that the messaging clients would need to be configured to provide an indication of presence status and that, depending on the embodiment, the messaging server, messaging clients, or both, would need to be configured to provide presence update data packets as described above.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of sharing presence information among a group of mobile communication devices configured to communicate over a wireless network, the mobile communication devices defining group members of the group, the method comprising:
   determining that a responsible member of the group for sending a data packet has failed to send the data packet within a first predetermined duration, the data packet being one of a content update data packet and a presence update data packet, the data packet being for use in determining a presence status of one or more group members;
   in response to determining that the responsible member has failed to send the data packet, determining a new responsible member for sending the data packet;
   sending the data packet, by the new responsible member, via a group messaging application, to at least one of the group members, a delivery acknowledgement being received from the at least one of the group members when the data packet is successfully received by the at least one of the group members;
   determining a presence status of one or more group members in accordance with whether the delivery acknowledgement is received from each group member to which the data packet was sent within a second predetermined duration from the sending of the data packet, the presence status of a group member being determined as available when the delivery acknowledgement is received from the group member within the second predetermined duration and the presence status of a group member being determined as unavailable when the delivery acknowledgement is not received from the group member within the second predetermined duration;
   storing the determined presence status in memory; and
   sending, by the new responsible member, a presence update comprising the determined presence status of the one or more of the group members to all of the group members.

2. The method of claim 1, wherein the presence status is determined to be one of two binary presence status options.

3. The method of claim 1, wherein the presence update includes the presence status for group members who are unavailable but does not include the presence status for group members who are available.

4. The method of claim 1, further comprising:
   receiving a presence update from one other group member; and
   storing the determined presence status of one or more group members specified in the presence update in memory in response to receiving the presence update.

5. The method of claim 1, further comprising:
   when a particular group member receives a presence update which includes a presence status of unavailable for the particular group member, sending a further presence update from the particular group member to all other group members, the further presence update including a presence status of available for the particular group member.

6. The method of claim 1, further comprising:
   displaying a user interface screen on a display screen, the user interface screen providing a group member status area for each group member, the user interface screen providing an indication of the presence status of the group members within the respective group member status areas in accordance with the stored presence status.

7. The method of claim 6, wherein the user interface screen is a main user interface screen of a group application manager, the main user interface screen including a list of the group members of the group, the list comprising the group member status areas of the respective group members.

8. The method of claim 6, wherein the presence status is indicated by at least one of a background colour of the group member status area, a text colour of the group member status area, and a presence status icon displayed in the group member status area.

9. The method of claim 1, further comprising:
   determining a presence status of a particular group member as unavailable when the delivery acknowledgement for a given data packet is not received from the particular group member within the predetermined duration;
   receiving a further presence update from the particular group member after the predetermined duration, the further presence update including updated presence status of the particular group member indicating the particular group member is available as well as the determined presence status of all other group members; and
   storing the updated presence status of the particular group member in memory as well as the determined presence status of all other group members indicated in the further presence update.

10. The method of claim 1 wherein the data packet is sent only to one or more group members from whom a data communication has not been received within a predetermined time interval.

11. A method of sharing presence information among a group of mobile communication devices configured to communicate over a wireless network, the mobile communication devices defining group members of the group, the method comprising:
  determining that a sending group member has failed to send a ping to one or more other group members within a predetermined time interval, the predetermined time interval being in accordance with a predetermined scheduling algorithm for the group, the predetermined scheduling algorithm being a round-robin scheduling algorithm in which each group member takes an equal turn in sending the ping to other members of the group;
  in response to determining that the sending group member has failed to send the ping, determining a new sending group member for sending the ping;
  sending, by the new sending group member, the ping to one or more other group members;
  determining a presence status in accordance with whether a ping response is received by the new sending group member from each group member to which the ping was sent within a predetermined duration from the sending of the ping;
  storing the determined presence status in memory; and
  sending, by the new sending group member, a presence update comprising the determined presence status of one or more of the group members to all of the group members.

12. The method of claim 11, wherein the predetermined time interval is measured from a time a last ping was sent or received.

13. The method of claim 11, wherein the predetermined time interval is measured from the earliest of a time a data packet was last received from the at least one other group member in the group, a time a delivery acknowledgement was last received from the at least one other group member in the group, or a time a ping was last sent or received.

14. The method of claim 11 wherein the ping is sent only to one or more group members from whom a data communication has not been received within the predetermined time interval.

15. A mobile communication device for sharing presence information among a group of mobile communication devices, comprising:
  a memory;
  a communication subsystem configured for at least data communication with a wireless network; and
  a controller electrically coupled to the communication subsystem and to the memory, the controller being configured for:
    defining group members of the group, the mobile communication device being a group member;
    determining that a responsible member of the group for sending a data packet has failed to send the data packet within a first predetermined duration, the data packet being one of a content update data packet and a presence update data packet, the data packet being for use in determining a presence status of one or more group members;
    in response to determining that the responsible member has failed to send the data packet, determining that the mobile communication device is a new responsible member for sending the data packet;
    sending a data packet, via a group messaging application, to at least one other of the group members, a delivery acknowledgement being received from the at least one other of the group members when the data packet is successfully received by the at least one other of the group members;
    determining a presence status of one or more group members in accordance with whether the delivery acknowledgement is received from each group member to which the data packet was sent within a second predetermined duration from the sending of the data packet, the presence status of a group member being determined as available when the delivery acknowledgement is received from the group member within the second predetermined duration and the presence status of a group member being determined as unavailable when the delivery acknowledgement is not received from the group member within the second predetermined duration;
    storing the determined presence status in memory; and
    sending a presence update comprising the determined presence status of one or more of the group members to all of the group members.

16. The device of claim 15, wherein the controller is further configured for receiving a presence update from one other of the group members, and storing the determined presence status of one or more group members specified in the presence update in memory in response to receiving the presence update.

17. The device of claim 15, wherein the controller is further configured for receiving a presence update which includes a presence status of unavailable for the particular group member represented by the mobile communication device, sending a further presence update to all other group members, the further presence update including a presence status of available for the particular group member.

18. The device of claim 15, further comprising a display screen electrically coupled to the controller, the controller being further configured for displaying a user interface screen on the display screen, the user interface screen providing a group member status area for each group member, the user interface screen providing an indication of the presence status of the group members within the respective group member status areas in accordance with the stored presence status.

19. The device of claim 15, wherein the controller is further configured for sending the data packet only to one or more group members from whom a data communication has not been received within a predetermined time interval.

20. A mobile communication device for sharing presence information among a group of mobile communication devices, comprising:
  a memory;
  a communication subsystem configured for at least data communication with a wireless network; and
  a controller electrically coupled to the communication subsystem and to the memory, the controller being configured for:
    defining group members of the group, the mobile communication device corresponding to a particular group member;
    determining that a sending group member has failed to send a ping to one or more other group members within a predetermined time interval, the predetermined time interval being in accordance with a predetermined scheduling algorithm for the group, the predetermined scheduling algorithm being a round-robin scheduling algorithm in which each group member takes an equal turn in sending the ping to other members of the group;
    in response to determining that the sending group member has failed to send the ping, determining that the mobile communication device is a new sending group member for sending the ping;

sending the ping to one or more other group members;

determining a presence status in accordance with whether a ping response is received from each group member to which the ping was sent within a predetermined duration from the sending of the ping;

storing the determined presence status in memory; and sending a presence update comprising the determined presence status of one or more of the group members to all of the group members.

21. The device of claim 20, wherein the predetermined time interval is measured from a time a last ping was sent or received.

22. The device of claim 20, wherein the predetermined time interval is measured from the earliest of one of a time a data packet was last received from the at least one other group member in the group, a time a delivery acknowledgement was last received from the at least one other group member in the group, and a time a ping was last sent or received.

23. The device of claim 20, wherein the predetermined time interval at which the ping is sent is less than or equal to a predetermined time interval at which a network ping is sent to group members configured to communicate with the wireless network when there has been no communication with the group members.

24. The device of claim 20, wherein the controller is further configured for sending the ping only to one or more group members from whom a data communication has not been received within the predetermined time interval.

* * * * *